United States Patent
Suzaki et al.

(10) Patent No.: US 11,601,823 B2
(45) Date of Patent: Mar. 7, 2023

(54) MOBILE STATION CONTROL METHOD AND MOBILE STATION CONTROL APPARATUS

(71) Applicant: Nippon Telegraph and Telephone Corporation, Tokyo (JP)

(72) Inventors: Kohei Suzaki, Musashino (JP); Yusuke Asai, Musashino (JP); Hiroyuki Shiba, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 45 days.

(21) Appl. No.: 17/256,401

(22) PCT Filed: Jun. 11, 2019

(86) PCT No.: PCT/JP2019/023095
§ 371 (c)(1),
(2) Date: Dec. 28, 2020

(87) PCT Pub. No.: WO2020/004010
PCT Pub. Date: Jan. 2, 2020

(65) Prior Publication Data
US 2021/0160707 A1 May 27, 2021

(30) Foreign Application Priority Data
Jun. 29, 2018 (JP) .............................. JP2018-124863

(51) Int. Cl.
*H04W 16/28* (2009.01)
*H04W 4/029* (2018.01)
(Continued)

(52) U.S. Cl.
CPC ............ *H04W 16/28* (2013.01); *B64C 39/024* (2013.01); *H04W 4/029* (2018.02); *H04W 36/06* (2013.01); *H04W 36/32* (2013.01); *H04W 84/06* (2013.01)

(58) Field of Classification Search
CPC ..... H04W 16/28; H04W 4/029; H04W 36/06; H04W 36/32; H04W 84/06; B64C 39/024; H04B 7/0695; H04B 7/0617
See application file for complete search history.

(56) References Cited

U.S. PATENT DOCUMENTS

2003/0216156 A1* 11/2003 Chun .................... H04W 16/28
455/562.1
2009/0073025 A1* 3/2009 Inoue .................... G01S 13/931
342/175
(Continued)

FOREIGN PATENT DOCUMENTS

JP 2014207687 10/2014

OTHER PUBLICATIONS

Higaki et al., "Design of Isolation Mechanism and Control Tracking for Satellite in Maritime Broadband Antenna System," IEICE, Technical Report, Dec. 1, 2008, J91-B(12):1578-1586, 19 pages (with English Translation).

(Continued)

*Primary Examiner* — Fred A Casca
(74) *Attorney, Agent, or Firm* — Fish & Richardson P.C.

(57) ABSTRACT

A mobile station control method by a computer for controlling a first mobile station for communicating with a second mobile station includes: distance detecting of detecting a distance between the first mobile station and the second mobile station; and first switching of switching a beam width of an electromagnetic wave emitted from the first mobile station to the second mobile station switching a beam (Continued)

width of an electromagnetic wave emitted from the first mobile station to the second mobile station the distance.

18 Claims, 9 Drawing Sheets

(51) Int. Cl.
*B64C 39/02* (2023.01)
*H04W 36/06* (2009.01)
*H04W 36/32* (2009.01)
*H04W 84/06* (2009.01)

(56) References Cited

U.S. PATENT DOCUMENTS

2013/0293376 A1* 11/2013 Poon .................... G08B 25/016
 340/539.12
2015/0351103 A1 12/2015 Kim et al.
2016/0134358 A1* 5/2016 Jalali .................. H04B 7/18504
 455/11.1
2018/0348365 A1* 12/2018 Achour .............. H01Q 15/0086

OTHER PUBLICATIONS

Kikuma, "Chapter IV New Trend in Adaptive Antennas," Adaptive Antenna Technology, Oct. 10, 2003, 12 pages (with English Translation).

Yoshida et al., "A Study of Configurations and Control Methods for a High Accuracy Auto-Tracking Antenna," IEICE, Technical Report, Apr. 24, 2003, pp. 19-24, 13 pages (with English Translation).

* cited by examiner

| DISTANCE [m] | FREE SPACE LOSS [dB] | BEAM SPREAD PER BEAM WIDTH [DEGREE] [m] | | | |
|---|---|---|---|---|---|
| | | 11.7 | 5.9 | 2.9 | 1.5 |
| 1.0 | −68.0 | 0.032 | 0.016 | 0.008 | 0.004 |
| 2.0 | −74.0 | 0.065 | 0.033 | 0.016 | 0.008 |
| 3.0 | −77.5 | 0.097 | 0.049 | 0.024 | 0.012 |
| 4.0 | −80.0 | 0.130 | 0.066 | 0.032 | 0.017 |
| 5.0 | −82.0 | 0.162 | 0.082 | 0.040 | 0.021 |
| 6.0 | −83.6 | 0.195 | 0.098 | 0.048 | 0.025 |
| 7.0 | −84.9 | 0.227 | 0.115 | 0.056 | 0.029 |
| 8.0 | −86.1 | 0.260 | 0.131 | 0.064 | 0.033 |

Fig. 5

| ANTENNA GAIN [dBi] | BEAM WIDTH [DEGREE] |
|---|---|
| 23.9 | 11.7 |
| 29.9 | 5.9 |
| 36.0 | 2.9 |
| 42.0 | 1.5 |

Fig. 6

MOBILE STATION CONTROL METHOD AND MOBILE STATION CONTROL APPARATUS

CROSS-REFERENCE TO RELATED APPLICATIONS

This application is a National Stage application under 35 U.S.C. § 371 of International Application No. PCT/JP2019/023095, having an International Filing Date of Jun. 11, 2019, which claims priority to Japanese Application Serial No. 2018-124863, filed on Jun. 29, 2018. The disclosure of the prior application is considered part of the disclosure of this application, and is incorporated in its entirety into this application.

TECHNICAL FIELD

The present invention relates to a mobile station control method and a mobile station control apparatus.

BACKGROUND ART

In recent years, as wireless communication, in addition to communication between a fixed station and a fixed station and communication between a mobile station and a base station, communication between a mobile station and a base station intervening a mobile station as a relay station, and communication between mobile stations (Machine-to-Machine (M2M)) are getting attention. For the above communications, wireless communication schemes based on The Institute of Electrical and Electronics Engineers, Inc. (IEEE) 802.11 standards represented by, for example, Wi-Fi, and cellular wireless communication schemes such as, for example, Long Term Evolution (LTE (trade name)) are commonly used.

However, in a case that a large capacity transmission is performed such that the total throughput amount is greater than or equal to 100 Mbps while moving within a wide range, the above-described wireless communication schemes may not be appropriate. This is because the power received at a wireless station is attenuated as the distance between wireless stations increases, and thus a desired Carrier to Noise Ratio (C/N ratio) is not satisfied.

High gain antennas are needed to achieve higher speed data communication while satisfying the desired C/N ratio. Because a high gain antenna is an antenna that generally has a large opening diameter, a width of a main beam is narrower. As a result, a movement of a mobile station makes it easier for the position of the mobile station to be outside the antenna direction. As such, a tracking mechanism is required to track a mobile station.

Traditionally, such a tracking mechanism is often utilized in communications between a satellite and mobile stations (Earth stations) that require a high gain antenna, for example. In satellite communications systems, a satellite and Earth stations are in a one-to-multiple communication. As such, the satellite is orienting an antenna in the direction of the Earth surface by attitude control. As a result, a tracking mechanism such as that described above is not used on the satellite side.

In contrast, each Earth station needs to orient an antenna towards the satellite. As such, an Earth station uses, for example, the Global Navigation Satellite System (GNSS) such as the Global Positioning System (GPS) and the Global Navigation Satellite System (GLONASS) or various sensors such as a gyroscopic sensor to detect the self-position. Then, the Earth station orients a main beam in the direction of the satellite, which is calculated based on the self-position and a position of the satellite registered in a database or the like in advance. The Earth station catches the satellite by, for example, a method of mechanical tracking using a conical scan or the like (see, for example, NPL 1 and NPL 2), or by a method of electronic tracking using an array antenna or the like (see, for example, NPL 3).

CITATION LIST

Non Patent Literature

NPL 1: Tomihiko Yoshida et al., "Study of Configuration and Control Method of High Accuracy Satellite Automatic Tracking Antenna", IEICE Technical Report A P2003-4 SAT2003-4, pp. 19-24, The Institute of Electronics, Information and Communication Engineers, 2003

NPL 2: Junichi Higaki et al., "Design Techniques for Vibration Isolation Mechanism System and Tracking Control System in Broad Band Antenna for Watercraft", IEICE Transactions B Vol. J91-B No. 12, pp. 1578-1586, The Institute of Electronics, Information and Communication Engineers, 2008

NPL 3: Nobuyoshi Kikuma. "Additive Antenna Technology", pp. 122-124, Ohmsha, Ltd., 2003

SUMMARY OF THE INVENTION

Technical Problem

As described above, the satellite communication system may only have a tracking mechanism on the Earth station side. In contrast, in communication between mobile stations (e.g., communication between a drone and a drone), both mobile stations need to know the relative positional relationship of each other. As such, there is a problem in the prior art that it is necessary to provide some configuration for increasing the accuracy required for a tracking mechanism, for example, providing a tracking mechanism on both mobile stations.

In wireless communication schemes based on the IEEE 802.11 standard, time division processing such as Time Division Multiple Access (TDMA) scheme is performed. Thus, only using a conical scan or an array antenna that performs tracking, based on the reception state of the communication signal, as described above, results in a time lag. This results in a case that the tracking cannot be performed. As such, there is a problem in the prior art that some configuration for increasing the accuracy required for the tracking mechanism is required.

In view of the above circumstances, an object of the present invention is to provide a technique in which communication over a wide communication range can be performed without increasing accuracy required for a tracking mechanism.

Means for Solving the Problem

An aspect of the present invention is a mobile station control method by a computer for controlling a first mobile station for communicating with a second mobile station, the mobile station control method including: detecting a distance between the first mobile station and the second mobile station; and switching a beam width of an electromagnetic wave emitted from the first mobile station to the second mobile station depending on the distance.

An aspect of the present invention is the mobile station control method described above, wherein the switching of the beam width includes switching the beam width to be wider as the distance becomes shorter.

An aspect of the present invention further includes moving the first mobile station to a position where the distance to the second mobile station is longer in a case that a value of a beam spread determined based on the beam width and the distance is less than a threshold value.

An aspect of the present invention is the mobile station control method described above, wherein the threshold value is a value based on an accuracy of movement in the moving of the first mobile station.

An aspect of the present invention is the mobile station control method described above, further including: detecting an obstacle present in a vicinity of the first mobile station or the second mobile station; and switching the beam width to be narrower in a case that the obstacle is detected.

An aspect of the present invention is the mobile station control method described above, further including: detecting an obstacle present in a vicinity of the first mobile station or the second mobile station; and moving the first mobile station to a position where the distance to the second mobile station is shorter in a case that the obstacle is detected.

An aspect of the present invention is the mobile station control method described above, further including: switching the beam width so that an intensity of a reflection wave resulting from the electromagnetic wave being reflected by the obstacle is greatest.

An aspect of the present invention is a mobile station control apparatus for controlling a first mobile station for communicating with a second mobile station, the mobile station control apparatus including: a distance information acquisition unit configured to acquire distance information for indicating a distance between the first mobile station and the second mobile station; and a switching unit configured to switch a beam width of an electromagnetic wave emitted from the first mobile station to the second mobile station depending on the distance based on the distance information.

Effects of the Invention

According to the present invention, communication over a wide range of communication can be performed without increasing accuracy required for a tracking mechanism.

BRIEF DESCRIPTION OF DRAWINGS

FIG. 5 is a table illustrating an example of the relationship between a distance between mobile stations, a free space loss, and a beam spread for each beam width.

FIG. 6 is a table illustrating an example of a relationship between an antenna gain and a beam width.

DESCRIPTION OF EMBODIMENTS

Hereinafter, embodiments of a mobile station control method according to the present invention will be described.

In each of the embodiments described below, a mobile station control method is described as an example of a case that wireless communication is performed between a drone on which a mobile station apparatus is mounted and a drone on which a mobile station apparatus is mounted. Hereinafter, a drone on which a mobile station apparatus is mounted is simply referred to as a "mobile station".

First Embodiment

Hereinafter, a mobile station control method according to a first embodiment of the present invention will be described with reference to drawings.

Figure 1:
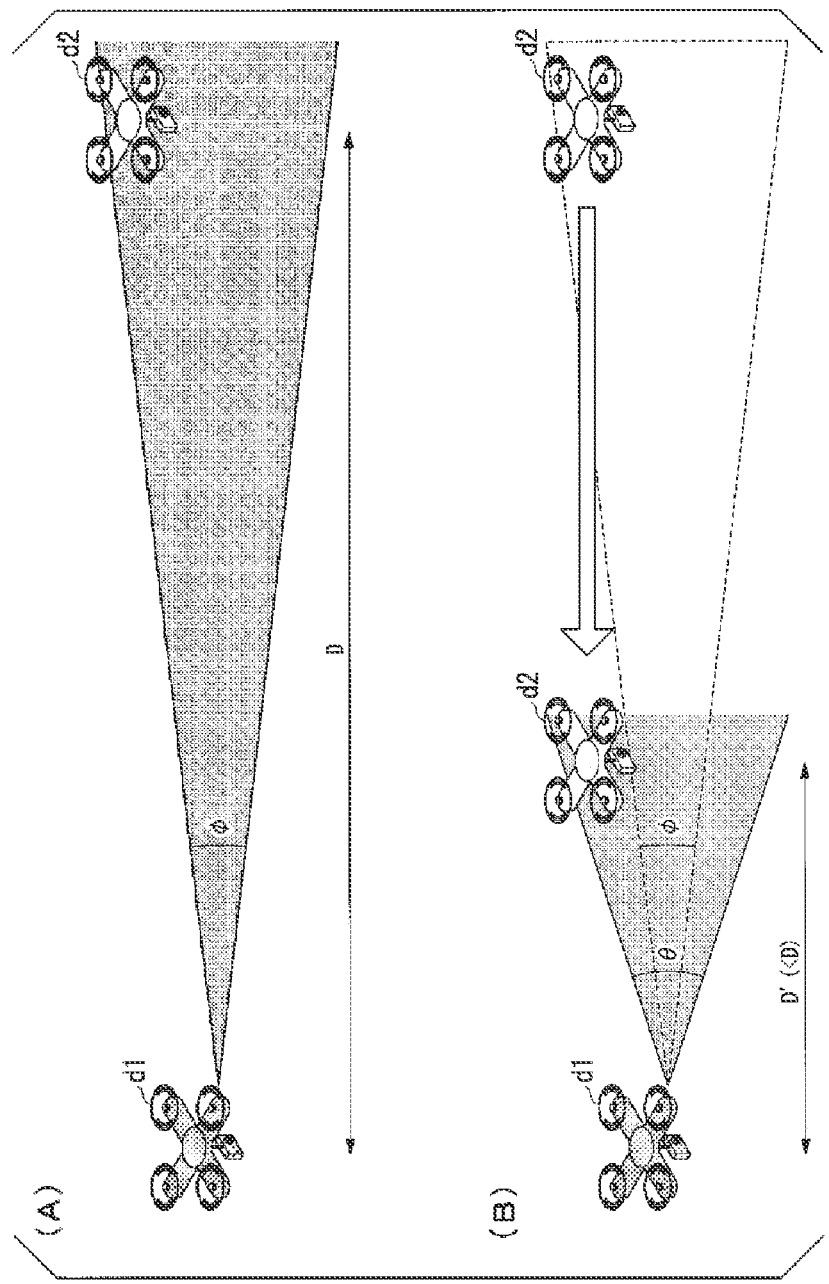
FIG. 1 is a schematic diagram for describing an overview of a mobile station control method according to a first embodiment of the present invention.

FIG. 1 is a schematic diagram for describing an overview of a mobile station control method according to the first embodiment of the present invention.

In FIG. 1, a mobile station d performs wireless communication with a mobile station d2 by using a directional antenna (not illustrated)(hereinafter referred to as an "antenna"). As such, the mobile station d1 includes a tracking mechanism for tracking the mobile station d2.

As illustrated in FIG. 1(A), a beam of electromagnetic waves transmitted from the antenna of the mobile station d1 is irradiated in a range of D sin φ. Here, D is the distance between the mobile station d1 and the mobile station d2. φ is the half width of the antenna directivity.

As illustrated in FIG. 1(A), the shorter the distance from the mobile station d1 is, the narrower the width of the irradiation range of the beam is (hereinafter referred to as a "beam spread"). As such, as the distance from the mobile station d1 to a tracking target object is shorter, higher accuracy is required for the tracking mechanism.

Note that, for example, a narrow beam antenna used for long-range wireless communication focuses energy on a main beam. As such, attenuation of electromagnetic waves of approximately −30 dB (decibel) to −40 dB is caused in a case that the tracking target falls outside the irradiation range of the beam. For example, the distance attenuation difference in free space between a case that the distance is 10 m and a case that the distance is 50 m is 13 dB. Thus, the electromagnetic waves attenuate more in a case that the tracking target falls outside the irradiation range of the beam than a case that the distance changes from 10 m to 50 m.

For example, in a case of using such a narrow beam antenna, the beam spread is approximately 30 cm wide at a position 10 m ahead of the irradiation position of the beam. Thus, in a case that the position of the mobile station (the mobile station d2) of the tracking target is not within the irradiation range of this width, the mobile station d1 cannot track the mobile station d2.

Assume that the mobile station d2 has moved to a position closer to the mobile station d1, for example, and the distance from the mobile station d1 to the mobile station d2 has changed from the distance D to the distance D'(<D). In this case, the beam spread becomes narrower as described above. As a result, as illustrated in FIG. 1(B), the mobile station d2 may fall outside the irradiation range of the beam illustrated in FIG. 1(A). Thus, the mobile station d1 according to the first embodiment switches the beam width from φ degrees to θ degrees depending on the distance from the mobile station d1 to the mobile station d2 in order to keep the mobile station d2 within the irradiation range of the beam.

The mobile station d1 according to the first embodiment includes, for example, a plurality of antennas having different beam widths. Then, the mobile station d1 switches the antenna that is used depending on the distance from the mobile station d1 to the mobile station d2.

Configuration of Mobile Station Control System

Figure 2:
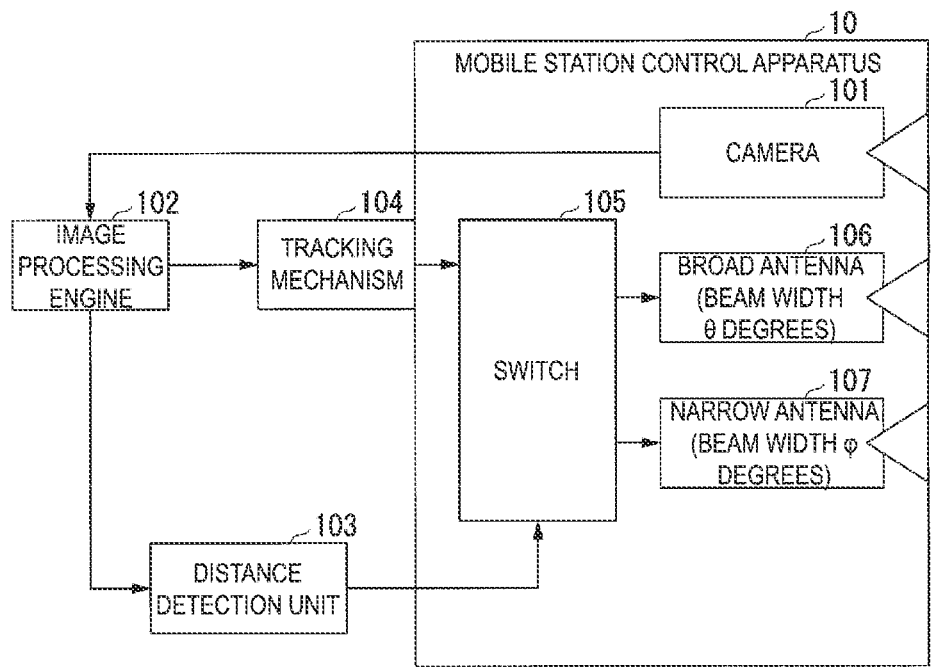
FIG. 2 is a block diagram illustrating an example of a configuration of a mobile station control system according to the first embodiment of the present invention.

An example of a configuration of a mobile station control system for controlling the mobile station d1 by the mobile station control method described above will be described below. FIG. 2 is a block diagram illustrating an example of a configuration of a mobile station control system according to the first embodiment of the present invention. As illustrated in FIG. 2, the mobile station control system includes a mobile station control apparatus 10, an image processing engine 102, a distance detection unit 103, and a tracking mechanism 104.

The mobile station control apparatus 10 includes a camera 101, a switch 105, abroad antenna 106, and a narrow antenna 107. The beam width of the beam irradiated by the broad antenna 106 is θ degrees and the beam width of the beam irradiated by the narrow antenna 107 is φ (<θ) degrees.

Note that instead of being provided in the housing of the mobile station control apparatus 10, the camera 101 may be provided as an external apparatus connected to the mobile station control apparatus 10. The image processing engine 102, the distance detection unit 103, and the tracking mechanism 104 may be provided in the housing of the mobile station control apparatus 10 instead of being provided as an external apparatus connected to the mobile station control apparatus 10.

The camera 101 captures an image in a direction of the mobile station d2. The camera 101 outputs image data for indicating the captured image to the image processing engine 102.

The image processing engine 102 analyzes the image data input from the camera 101 and identifies an image region indicating the mobile station d2 in the image based on the image data. Note that the image processing engine 102 may identify the image region indicating the mobile station d2 in the image by, for example, holding image data (master image data) for indicating the image captured by the mobile station d2 in advance and matching the master image data with the image data input from the camera 101.

The image processing engine 102 outputs information for indicating the image region indicating the mobile station d2 to the distance detection unit 103.

The image processing engine 102 also controls the tracking mechanism 104 so that the image region indicating the mobile station d2 is positioned in the center of the image based on the image data input from the camera 101.

The tracking mechanism 104 is attached to the mobile station control apparatus 10 and is configured to control the orientation of the mobile station control apparatus 10. As a result, the tracking mechanism 104 can control the capturing direction of the camera 101 included in the mobile station control apparatus 10 by controlling the orientation of the mobile station control apparatus 10.

For example, in a case that the image region indicating the mobile station d2 is positioned above the center in the image based on the image data input from the camera 101, the image processing engine 102 controls the tracking mechanism 104 so that the capturing direction of the camera 101 included in the mobile station d1 faces upward. For example, in a case that the image region indicating the mobile station d2 is positioned further to the left than the center in the image based on the image data input from the camera 101, the image processing engine 102 controls the tracking mechanism 104 so that the capturing direction of the camera 101 included in the mobile station d1 faces toward the left side. As a result, the mobile station d2 is tracked by the mobile station control system of the mobile station d1.

Note that the mobile station control apparatus 10 is configured to match the capturing direction of the camera 101 and the irradiation direction of the beam of electromagnetic waves emitted from the broad antenna 106 and the narrow antenna 107. As a result, the beam is irradiated toward a position that is captured in the center of the image based on the image data input from the camera 101.

The distance detection unit 103 detects a distance from the mobile station d1 to the mobile station d2, based on the information input from the image processing engine 102 for indicating the image region indicating the mobile station d2. For example, the distance detection unit 103 detects the distance based on the size of the image region indicating the mobile station d2 and the actual size of the mobile station d2. The distance detection unit 103 outputs distance information for indicating the distance from the mobile station d1 to the mobile station d2 to the switch 105.

The switch 105 compares the distance indicated by the distance information input from the distance detection unit 103 and a threshold value for indicating a prescribed distance stored in advance.

In a case that the distance indicated by the input distance information is less than a threshold value, the switch 105 performs switching so that the beam is irradiated from the broad antenna 106 having a beam width of θ degrees. In other words, the switch 105 performs switching so that wireless communication is performed by using the broad antenna 106.

In a case that the distance indicated by the input distance information is greater than or equal to the threshold value, the switch 105 switches so that the beam is irradiated from the narrow antenna 107 having a beam width of φ (<θ). In other words, the switch 105 switches so that wireless communication is performed by using the narrow antenna 107.

Note that the mobile station control apparatus 10 illustrated in FIG. 2 has a configuration including two types of antennas with different beam widths, but the present invention is not limited thereto. For example, the mobile station control apparatus 10 may have a configuration including three or more types of antennas with different beam widths, and may be configured to appropriately switch and use these three or more types of antennas depending on the distance from the mobile station d1 to the mobile station d2.

Note that instead of the mobile station control apparatus 10 including a plurality of antennas with different beam widths, the mobile station control apparatus 10 may have a configuration including an antenna capable of changing the beam width. In this case, the configuration described above can be realized, for example, by partially subtracting the power supply of the array elements of the phased array antenna.

Note that in this case, the configuration of the antenna is not limited to a configuration in which the beam width varies with discrete values, but the beam width may vary continuously.

Note that the mobile station control system illustrated in FIG. 2 is configured to detect the distance from the mobile station d1 to the mobile station d2 by analyzing the image by the camera 101, the image processing engine 102, and the distance detection unit 103 but the configuration is not limited thereto. For example, the mobile station control system may be configured to detect the distance from the mobile station d1 to the mobile station d2 by using a GNSS, a laser positioning meter or the like. Of course, the mobile station control system may be configured to detect the distance from the mobile station d1 to the mobile station d2 by combining a plurality of means among the distance measurement means of the image processing described above, a GNSS, a laser positioning meter, and the like.

Flow of Processing by Mobile Station Control Method

An example of a flow of the processing by the mobile station control method described above will be described below.

Figure 3:
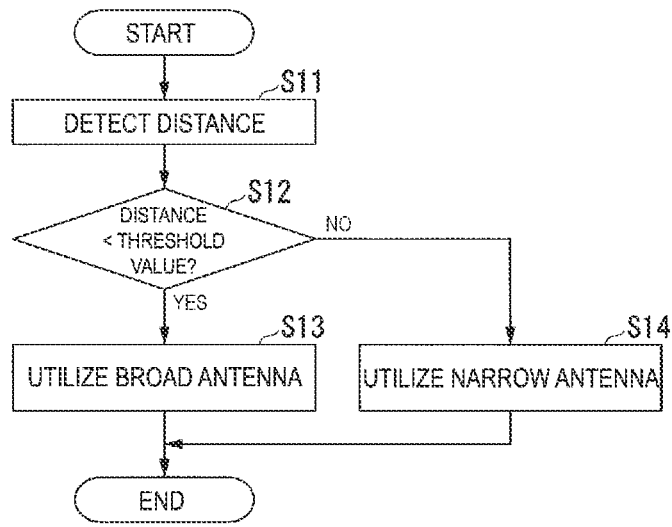
FIG. 3 is a flowchart illustrating a flow of processing by the mobile station control method according to the first embodiment of the present invention.

FIG. 3 is a flowchart illustrating a flow of the processing by the mobile station control method according to the first embodiment of the present invention.

The distance detection unit 103 receives input of information for indicating an image region indicating the mobile station d2, output from the image processing engine 102. The distance detection unit 103 detects a distance from the mobile station d1 to the mobile station d2, based on the input information for indicating the image region indicating the mobile station d2 (step S11). The distance detection unit 103 outputs distance information for indicating the distance from the mobile station d1 to the mobile station d2 to the switch 105.

The switch 105 compares the distance indicated by the distance information input from the distance detection unit 103 and a threshold value for indicating a prescribed distance stored in advance.

In a case that the distance indicated by the input distance information is less than a threshold value (Yes in step S12), the switch 105 switches to utilize the broad antenna 106 (step S13). In a case that the distance indicated by the input distance information is greater than or equal to the threshold value (No in step S12), the switch 105 switches to utilize the narrow antenna 107 (step S14).

Then, the processing in the flowchart illustrated in FIG. 3 is terminated.

Note that, for example, a value of D that satisfies $D \sin \theta < X$ (i.e., a value of $D < X/\sin \theta$) is configured for the threshold value. Here, D is the distance between the mobile stations (unit: m). $\theta$ is the antenna directivity half width (unit: degree). X is the positional accuracy of the mobile station (unit: m). Note that the above half width is the full width at half maximum, and is approximated by $2D \sin \theta/2 \approx D \sin \theta$. $2D \sin \theta/2$ may be used for the half width precisely.

Note that the positional accuracy X (m) of the mobile station depends on, for example, the spatial resolution of the position detection means such as a GNSS and the accuracy of the movement mechanism of the mobile station. In a case of a common GNSS, deviations in units of several m may occur. For the accuracy of the movement mechanism, in a case that the mobile station attempts to stay in the air, errors of approximately several 10 cm may occur due to effects such as wind, for example. Even in a case that the mobile station is on the ground, errors of approximately several 10 cm may occur with respect to the axial direction of the wheel due to the effect of steering or the like.

Second Embodiment

Hereinafter, the second embodiment of the present invention will be described with reference to drawings.

Figure 4:
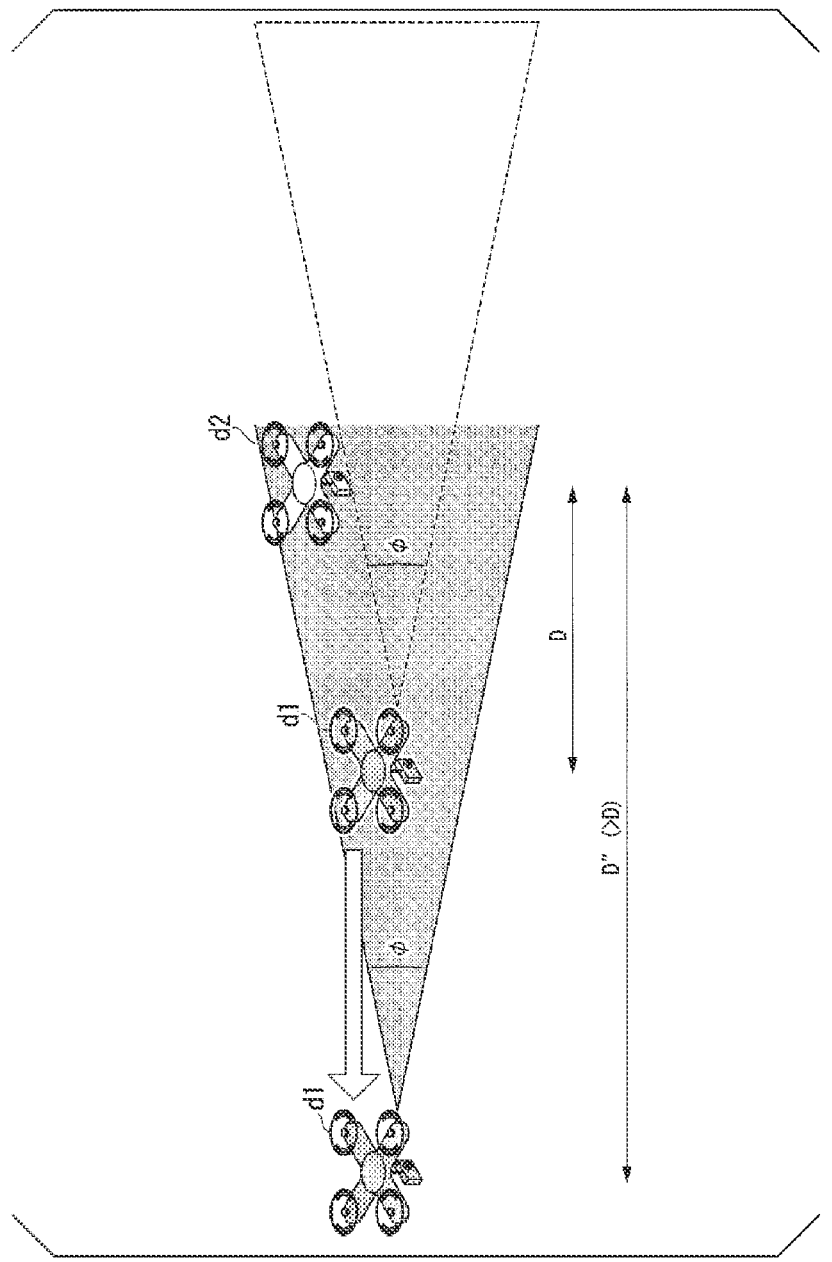
FIG. 4 is a schematic diagram for describing an overview of a mobile station control method according to a second embodiment of the present invention.

FIG. 4 is a schematic diagram for describing an overview of a mobile station control method according to the second embodiment of the present invention.

In FIG. 4, the mobile station d1 performs wireless communication with the mobile station d2 by using an antenna, similar to the first embodiment described above. As such, the mobile station d1 includes a tracking mechanism for tracking the mobile station d2.

As illustrated in FIG. 4, the beam of electromagnetic waves transmitted from the antenna of the mobile station d1 is irradiated in a range of $D \sin \varphi$. Here, D is the distance between the mobile station d1 and the mobile station d2. $\varphi$ is the half width of the antenna directivity.

As illustrated in FIG. 4, the shorter the distance from the mobile station d1, the narrower the beam spread irradiated from the mobile station d1. Thus, when the distance from the mobile station d1 is short, the mobile station d2, which is the tracking target, easily falls outside the irradiation range of the beam. In other words, the possibility that the mobile station d1 cannot track the mobile station d2 is increased.

Thus, in a case that the distance between the mobile station d1 and the mobile station d2 is shorter than a prescribed distance, the mobile station d1 according to the second embodiment moves away from the mobile station d2 in order to keep the mobile station d2 within the irradiation range of the beam. For example, as illustrated in FIG. 4, the mobile station d1 moves from a position where the distance from the mobile station d2 is D to a position where the distance from the mobile station d2 is D" (>D).

As a result, the beam spread irradiated from the mobile station d1 at the position of the mobile station d2 becomes wider. As a result, the mobile station control method according to the second embodiment can reduce the possibility that the mobile station d1 cannot track the mobile station d2.

Modified Example of Second Embodiment

Hereinafter, a modified example of the second embodiment of the present invention will be described with reference to drawings.

The mobile station control method according to the second embodiment of the present invention described above may be configured to optimize the power margin in consideration of free space loss and antenna gain by combining with the mobile station control method according to the first embodiment (that is, a configuration that switches and uses a plurality of antennas with different beam widths).

FIG. 5 is a table illustrating an example of the relationship between the distance between mobile stations, the free space loss, and the beam spread for each beam width. As illustrated in FIG. 5, for example, the free space loss at a position where the distance from the mobile station d1 is "6.0 m" is "−83.6 dB". As illustrated in FIG. 5, for example, the beam spread at a position where the distance from the mobile station d1 is "6.0 m" is "0.048 m" (i.e. 4.8 cm) in a case that an antenna with a beam width of "2.9 degrees" is used.

FIG. 6 is a table illustrating an example of the relationship between the antenna gain and the beam width. As illustrated in FIG. 6, for example, in a case that an antenna with a beam width of "2.9 degrees" is used, the antenna gain is "36.0 dBi".

Consider, for example, a case of using a mobile station with a movement mechanism with accuracy of 3 cm (i.e. 0.03 m).

For example, in a case that the distance from the mobile station d1 to the mobile station d2 is 6.0 m, an antenna having a beam width of 2.9 degrees or greater must be used. This is because, in a case that the distance is 6.0 m, when using an antenna that irradiates a beam having a beam width of 1.5 degrees, a beam spread is 0.025 m (2.5 cm) and is narrower than 3 cm, which is the accuracy of the movement mechanism of the mobile station, from the values shown in the table in FIG. 5.

In a case that the distance is 6.0 m, the level diagram in a case of using an antenna with a beam width of 2.9 degrees or greater is −83.6 dB (free space loss)+36.0 dBi (antenna gain)=−47.6 dBm, from the values shown in the tables in FIGS. 5 and 6.

Here, for example, in a case that the lower limit of the dynamic range is −45 dBm and the transmission power cannot be changed, −47.6 dBm, which is the value of the level diagram described above, is less than −45 dBm, which is the lower limit of the dynamic range. Thus, in this case, communication is not established without using an antenna that irradiates a beam having a beam width of 1.5 degrees. This is because, in a case that an antenna that irradiates a beam having a beam width of 1.5 degrees is used, the level diagram will be −83.6 dB (free space loss)+42.0 dBi (antenna gain)=−41.6 dBm, and is not less than −45 dBm, which is the lower limit of the dynamic range, from the values shown in the tables in FIGS. 5 and 6.

However, in a case that the distance from the mobile station d1 to the mobile station d2 is 6.0 m apart, the beam spread is 0.025 m (i.e. 2.5 cm), as described above, in a case that an antenna that irradiates a beam having a beam width of 1.5 degrees is used. Thus, the beam spread becomes narrower than 3 cm, which is the accuracy of the movement mechanism of the mobile station. Thus, the mobile station d1 needs to move away from the mobile station d2.

Thus, the mobile station control apparatus 10 of the mobile station d1 controls the mobile station d1 to move to a position where the distance from the mobile station d2 is 8.0 m, for example. From the values shown in the tables in FIGS. 5 and 6, in a case that the distance from the mobile station d1 to the mobile station d2 is 8 m apart, the level diagram is −86.1 dB (free space loss)+42.0 dBi (antenna gain)=−44.1 dBm, in a case that an antenna that irradiates a beam having a beam width of 1.5 degrees is used. Thus, the level diagram is not less than the lower limit of the dynamic range, −45 dBm.

From the value illustrated in FIG. 5, the beam spread at a position where the distance from the mobile station d1 is 8.0 m is 0.033 m (that is, 3.3 cm) in a case that an antenna that irradiates a beam having a beam width of 1.5 degrees is used. Thus, in this case, the beam spread is not narrower than 3 cm, which is the accuracy of the movement mechanism of the mobile station.

From the foregoing, the mobile station control apparatus 10 may determine, based on the values shown in the tables in FIGS. 5 and 6, to switch to an antenna that irradiates a beam with a beam width of 1.5 degrees, and to control the mobile station d1 to move to a position where the distance from the mobile station d2 is 8.0 m. In this manner, the mobile station control apparatus 10 can control the beam width and control the distance between the mobile station d1 and the mobile station d2 to optimize the power margin in consideration of free space loss and antenna gain.

Configuration of Mobile Station Control System

An example of a configuration of a mobile station control system for controlling the mobile station d1 by the mobile station control method described above will be described below.

Figure 7:
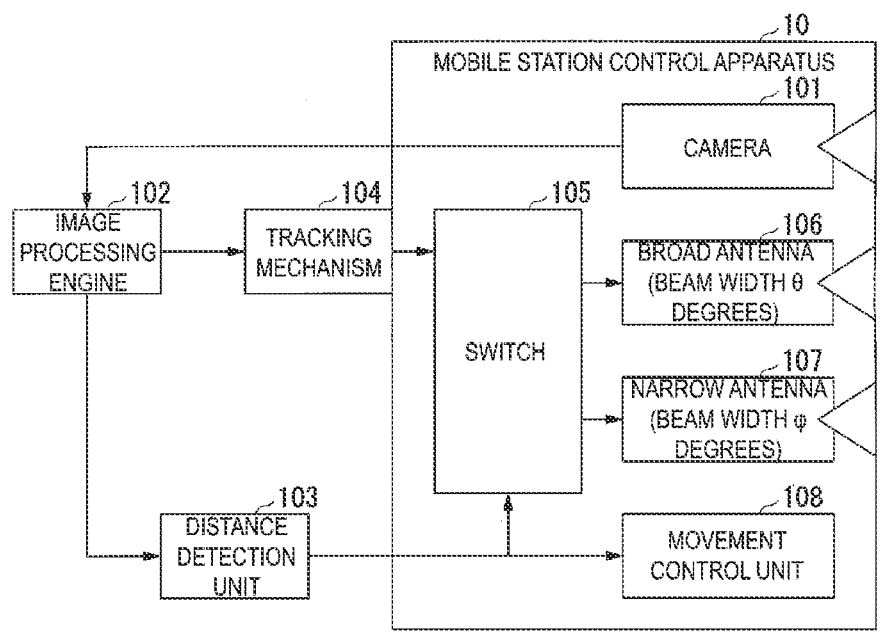
FIG. 7 is a block diagram illustrating an example of a configuration of a mobile station control system according to a modified example of the second embodiment of the present invention.

FIG. 7 is a block diagram illustrating an example of a configuration of the mobile station control system according to the modified example of the second embodiment of the present invention. As illustrated in FIG. 7, the mobile station control system includes a mobile station control apparatus 10, an image processing engine 102, a distance detection unit 103, and a tracking mechanism 104.

The mobile station control apparatus 10 includes a camera 101, a switch 105, abroad antenna 106, a narrow antenna 107, and a movement control unit 108.

Note that, as illustrated in FIG. 7, the configuration of the mobile station control system according to the modified example of the second embodiment differs from the configuration of the mobile station control apparatus 10 according to the first embodiment described with reference to FIG. 2 in that the mobile station control system according to the modified example of the second embodiment is provided with the movement control unit 108.

Note that a configuration common to the mobile station control system according to the first embodiment will be omitted below.

The distance detection unit 103 determines the antenna to be used and the optimal distance between the mobile station d1 and the mobile station d2 by the mobile station control method described above.

Then, the distance detection unit 103 outputs information for indicating the antenna to be used to the switch 105. The switch 105 switches the antenna to be used based on the distance detection unit 103 input information.

The distance detection unit 103 outputs information for indicating the optimal distance between the mobile station d1 and the mobile station d2 to the movement control unit 108. The movement control unit 108 moves the mobile station d1, based on the information input to the distance detection unit 103.

Flow of Processing by Mobile Station Control Method

An example of a flow of the processing by the mobile station control method described above will be described below.

Figure 8:
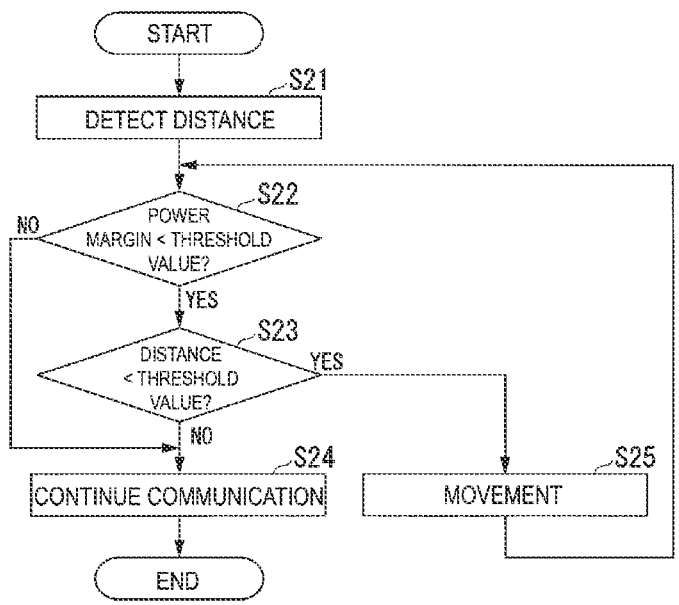
FIG. 8 is a flowchart illustrating a flow of processing by a mobile station control method according to the modified example of the second embodiment of the present invention.

FIG. 8 is a flowchart illustrating a flow of processing by the mobile station control method according to the modified example of the second embodiment of the present invention.

The distance detection unit 103 receives input of information for indicating an image region indicating the mobile station d2, output from the image processing engine 102. The distance detection unit 103 detects a distance from the mobile station d1 to the mobile station d2, based on the input information for indicating the image region indicating the mobile station d2 (step S21).

The distance detection unit 103 determines whether or not the power margin is lower than a prescribed threshold value, based on the detected distance and the values shown in the tables in FIGS. 5 and 6 (step S22). Here, the prescribed threshold value is, for example, the lower limit of the dynamic range described above.

In a case that the power margin is not lower than a prescribed threshold value (No in step S22), the mobile station d1 continues communication (step S24). Then, the processing in the flowchart illustrated in FIG. 8 is terminated.

In a case that the power margin is lower than a prescribed threshold value (Yes in step S22), the distance detection unit 103 determines whether or not the distance from the mobile station d1 to the mobile station d2 is shorter than a prescribed threshold value (step S23).

Note that, for example, a value of D that satisfies D sin θ<X (i.e., a value of D<X/sin θ) is configured for the threshold value. Here. D is the distance between the mobile stations (unit: m). θ is the antenna directivity half width (unit: degree). X is the positional accuracy of the mobile station (unit: m).

Ina case that the distance from the mobile station d1 to the mobile station d2 is not shorter than a prescribed threshold value (No in step S23), the mobile station d1 continues communication (step S24). Then, the processing in the flowchart illustrated in FIG. 8 is terminated.

In a case that the distance from the mobile station d1 to the mobile station d2 is shorter than a prescribed threshold value (Yes in step S23), the mobile station d1 moves to a position where the distance from the mobile station d1 to the mobile station d2 is not shorter than the prescribed threshold value (step S25). Then, the process returns to step S22 again.

Third Embodiment

Hereinafter, the third embodiment of the present invention will be described with reference to the drawings.

Figure 9:
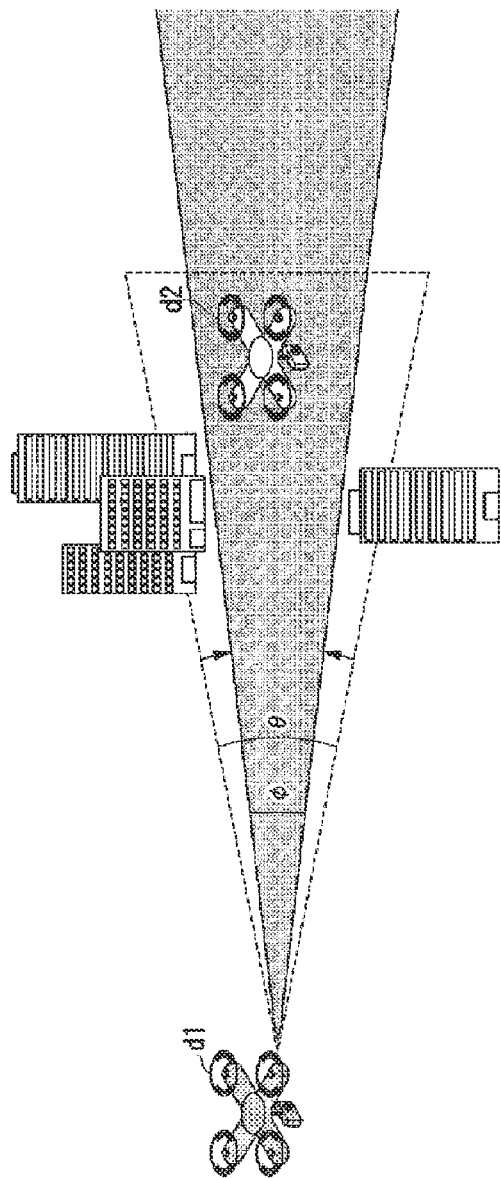
FIG. 9 is a schematic diagram for describing an overview of a mobile station control method according to a third embodiment of the present invention.

FIG. 9 is a schematic diagram for describing an overview of a mobile station control method according to the third embodiment of the present invention.

In a case that an obstacle, shield, reflector, or the like (hereinafter referred to as an "obstacle or the like") is present in the vicinity of the mobile stations, the obstacle or the like may adversely affect the wireless communication performed between the mobile stations. Thus, in a case that an obstacle or the like is present in a range of a prescribed distance from the wireless station d1 or the wireless station d2 which is a communication partner, the mobile station control apparatus 10 switches to another antenna having a different beam width, similar to the first embodiment.

Note that the mobile station control apparatus 10 according to the third embodiment holds the value of the beam width and the value of the side beam width of the antenna included in the mobile station control apparatus 10.

As illustrated in FIG. 9, for example, there are buildings in the vicinity of the mobile station d2. Some of the buildings are within the irradiation range of the beam with a beam width of θ degrees. Thus, in a case that electromagnetic waves are reflected or blocked by these buildings, the wireless communication performed between the mobile station d1 and the mobile station d2 is adversely affected.

In a case that the mobile station control apparatus 10 of the mobile station d according to the third embodiment detects that an obstacle or the like exists within a range of a prescribed distance from the mobile station d2, the mobile station d1 switches from an antenna that irradiates a beam having a beam width of θ degrees to an antenna that irradiates a beam having a beam width of φ (<θ). Thus, as illustrated in FIG. 9, the beam spread of the beam irradiated from the mobile station d1 becomes narrower, and there is no build in the irradiation range of the beam. As a result, a stable wireless communication is possible between the mobile station d1 and the mobile station d2.

Note that the range of the prescribed distance as used herein may be based on the Fresnel radius instead of being a range based on the beam spread calculated from the beam width.

Note that in a case that there is an obstacle or the like on the mobile station side of the communication partner, it is preferable to notify the mobile station of the communicating party of the existence of an obstacle or the like within the range of the prescribed distance.

Note that, as a method for detecting an obstacle or the like, the mobile station control apparatus 10 may hold data for indicating the position of an obstacle or the like in advance, and detect an obstacle or the like based on the data.

Alternatively, the mobile station control apparatus 10 may detect an obstacle or the like by a camera, a sensor, or the like. Alternatively, the mobile station control apparatus 10 may detect an obstacle or the like based on an actual communication deterioration condition, or the like.

Flow of Processing by Mobile Station Control Method

The flow of the processing according to the mobile station control method according to the third embodiment of the present invention is substantially the same as the flow of the processing by the mobile station control method according to the first embodiment described with reference to the flowchart of FIG. 3. The mobile station control method according to the third embodiment differs from the mobile station control method according to the first embodiment in that the prescribed threshold value used in step S12 of the flowchart of FIG. 3 is configured as follows.

For example, a value of D that satisfies D sin θ<d (i.e., a value of D<d/sin θ) is configured for the threshold value. Here, D is the distance between the mobile stations (unit: m). θ is the antenna directivity half width (unit: degree). d is the distance between the mobile station d2 and the obstacle or the like (unit: m).

In this way, in the mobile station control method according to the third embodiment, the antenna is switched so that the beam spread is less than the distance between the mobile station d2 and the obstacle or the like.

Modified Example of Third Embodiment

Hereinafter, a modified example of the third embodiment of the present invention will be described with reference to drawings.

Figure 10:
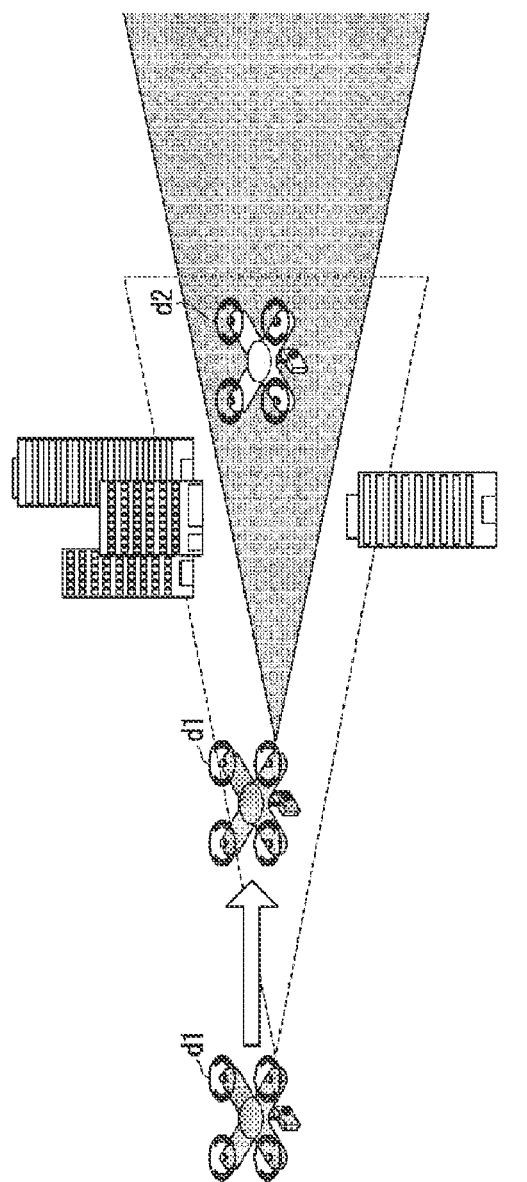
FIG. 10 is a schematic diagram for describing an overview of a mobile station control method according to a modified example of the third embodiment of the present invention.

FIG. 10 is a schematic diagram for describing an overview of a mobile station control method according to a modified example of the third embodiment of the present invention.

As described above, in a case that an obstacle or the like is present near the mobile stations, the obstacle or the like may adversely affect the wireless communication performed between the mobile stations. As such, the mobile station control apparatus 10 according to the modified example of the third embodiment moves the wireless station d1 in a direction approaching to the wireless station d2 in a case that an obstacle or the like is present in a range of a prescribed distance from the wireless station d1 or the wireless station d2 which is a communication partner.

Thus, as illustrated in FIG. 10, the beam spread of the beam irradiated from the mobile station d1 becomes narrower at a position where the buildings are present, so there is no building in the irradiation range of the beam. As a result, a stable wireless communication is possible between the mobile station d1 and the mobile station d2.

Fourth Embodiment

Hereinafter, the fourth embodiment of the present invention will be described with reference to the drawings.

Figure 11:
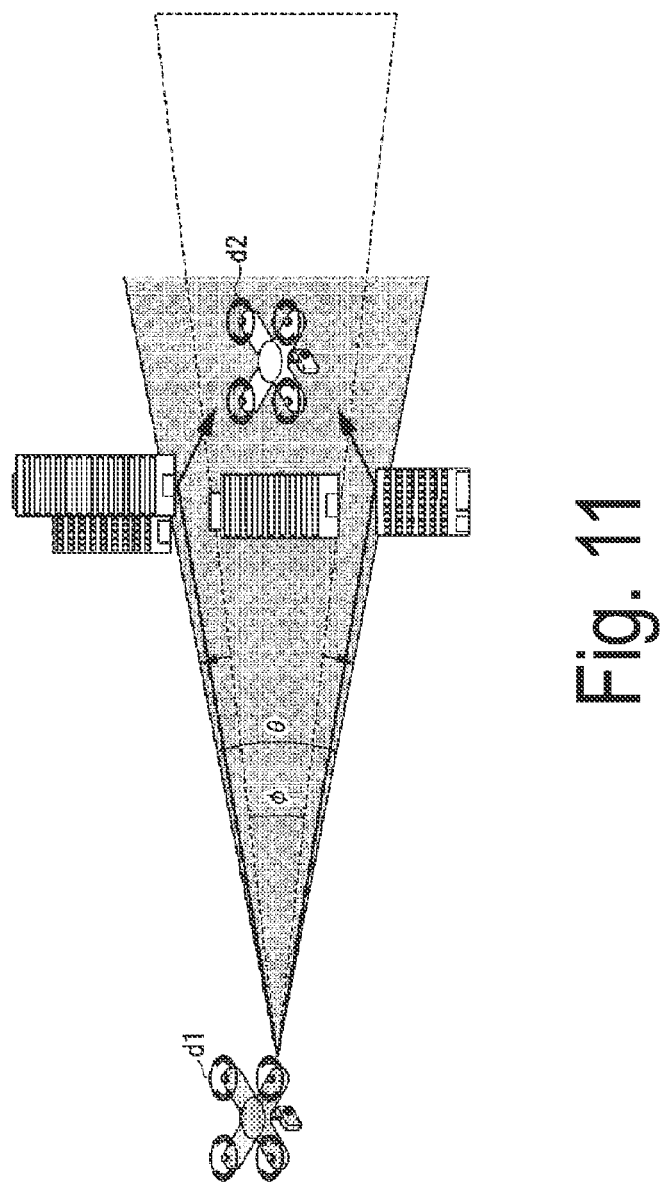
FIG. 11 is a schematic diagram for describing an overview of a mobile station control method according to a fourth embodiment of the present invention.

FIG. 11 is a schematic diagram for describing an overview of a mobile station control method according to the fourth embodiment of the present invention.

Even in a case that the mobile station control method according to the third embodiment described above or the mobile station control method according to the modified example of the third embodiment described above is implemented it may be difficult to prevent the presence of an obstacle or the like within the irradiation range of the beam. For example, it is a case that a large number of buildings or the like are standing close together in the vicinity of the mobile stations, and the like.

In such a case, the mobile station control apparatus 10 of the mobile station d1 according to the fourth embodiment detects the positional relationship between the mobile station d2 and the obstacle or the like, and irradiates the beam to the obstacle or the like. For example, as illustrated in FIG. 11, the mobile station control apparatus 10 switches from an antenna that irradiates a beam having a beam width of φ degrees to an antenna that irradiates a beam having a beam width of θ degrees. In this way, the mobile station control apparatus 10 intentionally puts the obstacle or the like to be within the irradiation range of the beam.

The mobile station control apparatus 10 of the mobile station d1 operates to search for the position at which the reflected waves of the beam irradiated to the obstacle or the like reach the mobile station d2.

Note that in this case, the mobile station d2 which is the communication partner may irradiate the beam to the obstacle or the like, and the mobile station d1 may move to a position at which the beam can be received, so that fine-tuning of the movement destination position of the mobile station d1 may be performed.

Note that the mobile station control apparatus 10 of the mobile station d1 may acquire information such as reception level and throughput from the mobile station d2.

Flow of Processing by Mobile Station Control Method

An example of a flow of the processing by the mobile station control method described above will be described below.

Figure 12:
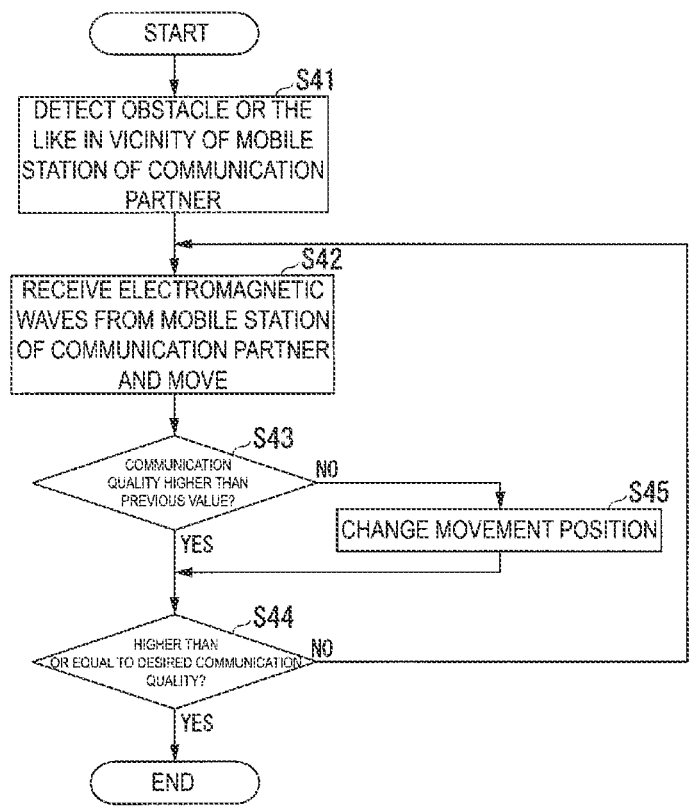
FIG. 12 is a flowchart illustrating a flow of processing by a mobile station control method according to a modified example of the fourth embodiment of the present invention.

FIG. 12 is a flowchart illustrating a flow of processing by the mobile station control method according to a modified example of the fourth embodiment of the present invention.

The mobile station control apparatus 10 of the mobile station d1 detects an obstacle or the like in the vicinity of the mobile station d2 which is a communication partner (step S41).

Upon receiving the electromagnetic waves emitted from the mobile station d2, the mobile station control apparatus 10 moves the mobile station d1 to any position (step S42).

The mobile station control apparatus 10 compares the value of the communication quality at the position after the movement with the value (previous value) of the communication quality at the previous position. Note that the communication quality as used herein is, for example, a Received Signal Strength Indication (RSSI), a throughput, a Bit Error Rate (BER), or a Packet Error Rate (PER), and the like.

In a case that the communication quality is higher than the previous value (YES in step S43), the mobile station control apparatus 10 determines whether or not the communication quality is greater than or equal to a desired communication quality (step S44). In a case that the communication quality is not higher than the previous value (No in step S43), the mobile station control apparatus 10 changes the movement position of the mobile station d1 (step S45) and determines whether or not the communication quality is greater than or equal to the desired communication quality (step S44).

In a case that the communication quality is not greater than or equal to the desired communication quality (No in step S44), the process returns to step S42.

In a case that the communication quality is greater than or equal to the desired communication quality (Yes in step S44), the process illustrated in the flowchart of FIG. 12 ends.

Each embodiment of the present invention has been described above.

As described above, the mobile station control method according to the first embodiment of the present invention is a mobile station control method for controlling a mobile station d1 (first mobile station) in communication with a mobile station d2 (second mobile station). The mobile station control method detects a distance between the mobile station d1 and the mobile station d2. Then, the mobile station control method switches the beam width of the electromagnetic waves emitted by the mobile station d1 to the mobile station d2 depending on the detected distance.

As described above, the mobile station control method according to the first embodiment of the present invention switches the beam width of the electromagnetic waves emitted by the mobile station d1 to the mobile station d2 to be wider as the distance between the mobile station d1 and the mobile station d2 gets shorter.

As described above, the mobile station control method according to the modified example of the second embodiment of the present invention moves the mobile station d1 to a position where the distance to the mobile station d2 is longer in a case that a value of the beam spread determined depending on a beam width and the distance between the mobile station d1 and the mobile station d2 is shorter than a threshold value.

As described above, in the modified example of the second embodiment of the present invention, the threshold value is a value based on the accuracy of the movement of the mobile station.

As described above, the mobile station control method according to the third embodiment of the present invention detects an obstacle or the like present in the vicinity of the mobile station d1 or the mobile station d2. Then, in a case that an obstacle or the like is detected, the mobile station control method switches the beam width to be narrower.

As described above, the mobile station control method according to the modified example of the third embodiment of the present invention detects an obstacle or the like present in the vicinity of the mobile station d1 or the mobile station d2. Then, in a case that an obstacle or the like is detected, the mobile station control method moves the mobile station d1 to a position where the distance to the mobile station d2 is shorter.

As described above, the mobile station control method according to the modified example of the fourth embodiment of the present invention switches the beam width so that the intensity of the reflection waves resulting from the electromagnetic waves being reflected by the obstacle or the like is greatest.

According to the configurations described above, according to the mobile station control method according to each embodiment of the present invention, communication over a wide range of communication can be performed without increasing the accuracy required for the tracking mechanism.

Although the embodiments of the present invention have been described above with reference to the drawings, it is clear that the above embodiments are merely examples of the present invention, and the present invention is not limited to the embodiments described above. Thus, addition, omission, substitution, and other modifications of the constituent components may be made without departing from the spirit and scope of the present invention.

The mobile station control system according to the embodiments described above may be implemented by a computer. In such a case, the functions may be implemented by recording a program for implementing their functions in a computer-readable recording medium, and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. The above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

REFERENCE SIGNS LIST

10 Mobile station control apparatus
101 Camera
102 Image processing engine
103 Distance detection unit
104 Tracking mechanism
105 Switch
106 Broad antenna
107 Narrow antenna
108 Movement control unit

The invention claimed is:

1. A mobile station control method by a computer for controlling a first mobile station for communicating with a second mobile station, the mobile station control method comprising:
  detecting a distance between the first mobile station and the second mobile station;
  switching a beam width of an electromagnetic wave emitted from the first mobile station to the second mobile station based on the detected distance; and
  moving the first mobile station to a position where a distance between the first mobile station and the second mobile station is greater than the detected distance based on a value of a beam spread determined according to the beam width and the distance being less than a threshold value.

2. The mobile station control method according to claim 1, wherein switching the beam width includes increasing the beam width as the detected distance decreases.

3. The mobile station control method according to claim 2, wherein switching the beam width includes switching to a first antenna implemented with a first beam width from a second antenna implemented with a second beam width, the first beam width being greater than the second beam width.

4. The mobile station control method according to claim 1, wherein the threshold value is based on an accuracy of movement in the movement of the first mobile station.

5. The mobile station control method according to claim 1, further comprising:
  detecting an obstacle present in a predetermined range of distance from the first mobile station or the second mobile station; and
  reducing the beam width based on the obstacle being detected.

6. The mobile station control method according to claim 5, further comprising:
  switching the beam width so that an intensity of a reflection wave resulting from an electromagnetic wave being reflected by the obstacle is greatest.

7. The mobile station control method according to claim 1, further comprising:
  detecting an obstacle present in a predetermined range of distance from the first mobile station or the second mobile station; and
  based on the obstacle being detected, moving the first mobile station toward the second mobile station.

8. The mobile station control method according to claim 1, wherein switching the beam width includes decreasing the beam width as the detected distance increases.

9. The mobile station control method according to claim 8, wherein switching the beam width includes switching to a first antenna implemented with a first beam width from a second antenna implemented with a second beam width, the first beam width being less than the second beam width.

10. A mobile station control apparatus for controlling a first mobile station for communicating with a second mobile station, the mobile station control apparatus comprising:
  a distance information acquisition unit, implemented using one or more computing devices, configured to acquire distance information that indicate a distance between the first mobile station and the second mobile station;
  a switching unit, implemented using one or more computing devices, configured to switch a beam width of an electromagnetic wave emitted from the first mobile station to the second mobile station based on the distance indicated in the distance information; and
  a movement controller, implemented using one or more computing devices, configured to move the first mobile station to a position where a distance between the first mobile station and the second mobile station is greater than the distance indicated in the distance information based on a value of a beam spread determined according to the beam width and the distance being less than a threshold value.

11. The mobile station control apparatus according to claim 10, wherein the switching unit is configured to increase the beam width as the distance between the first mobile station and the second mobile station decreases.

12. The mobile station control apparatus according to claim 11, wherein switching the beam width includes switching to a first antenna implemented with a first beam width from a second antenna implemented with a second beam width, the first beam width being greater than the second beam width.

13. The mobile station control apparatus according to claim 10, wherein the threshold value is determined based on an accuracy of movement in the movement of the first mobile station.

14. The mobile station control apparatus according to claim 10, further comprising:
- a sensor configured to detect an obstacle present in a predetermined range of distance from the first mobile station or the second mobile station,
- wherein the switching unit is configured to, based on the obstacle being detected, reduce the beam width.

15. The mobile station control apparatus according to claim 14, wherein the switching unit is configured to switch the beam width so that an intensity of a reflection wave resulting from an electromagnetic wave being reflected by the obstacle is greatest.

16. The mobile station control apparatus according to claim 10, further comprising:
- a sensor configured to detect an obstacle present in a predetermined range of distance from the first mobile station or the second mobile station,
- wherein the movement controller is configured to, based on the obstacle being detected, move the first mobile station toward the second mobile station.

17. The mobile station control apparatus according to claim 10, wherein the switching unit is configured to decrease the beam width as the distance between the first mobile station and the second mobile station increases.

18. The mobile station control apparatus according to claim 17, wherein switching the beam width includes switching to a first antenna implemented with a first beam width from a second antenna implemented with a second beam width, the first beam width being less than the second beam width.

* * * * *